United States Patent [19]
Brock et al.

[11] Patent Number: 5,152,166
[45] Date of Patent: Oct. 6, 1992

[54] METHOD AND APPARATUS FOR DETERMINING THE DIMENSIONAL ACCURACY OF WORKPIECE SURFACES

[75] Inventors: James R. Brock, Livonia; Ron Martin, Ann Arbor, both of Mich.; Wilfried Gerk, Rödermark, Fed. Rep. of Germany

[73] Assignee: Samson AG, Frankfurt, Fed. Rep. of Germany

[21] Appl. No.: 641,502

[22] Filed: Jan. 15, 1991

[30] Foreign Application Priority Data

Feb. 12, 1990 [DE] Fed. Rep. of Germany ....... 4004237

[51] Int. Cl.$^5$ ............................................. G01B 13/16
[52] U.S. Cl. ......................................................... 73/37.9
[58] Field of Search ................................. 73/37.9, 37.5

[56] References Cited

U.S. PATENT DOCUMENTS

| | | | |
|---|---|---|---|
| 3,201,974 | 8/1965 | Croshier | 73/37.9 |
| 3,241,356 | 3/1966 | Blaiklock | 73/37.9 |
| 3,782,171 | 1/1974 | Watt | 73/37.9 |
| 4,016,747 | 4/1977 | Radev | 73/37.9 |
| 4,121,451 | 10/1978 | Radev et al. | 73/37.9 |

FOREIGN PATENT DOCUMENTS

| | | |
|---|---|---|
| 1548312 | 9/1969 | Fed. Rep. of Germany . |
| 2139359 | 7/1972 | Fed. Rep. of Germany . |
| 1623271 | 7/1973 | Fed. Rep. of Germany . |
| 16436 | 2/1959 | German Democratic Rep. . |

OTHER PUBLICATIONS

Pneumatisch Oberflächen Messen, Industrie-Anzeiger 45/1988, pp. 16-18.
FAG Lagresystem-Diagnose, Wälzlagertechnik 2/71, pp. 42-43.

Primary Examiner—Hezron E. Williams
Assistant Examiner—Joseph W. Roskos
Attorney, Agent, or Firm—Anderson Kill Olick & Oshinsky

[57] ABSTRACT

A method and an apparatus for determining the dimensional accuracy of workpiece surfaces, for example, of essentially cylindrical workpiece surfaces, wherein a measuring sensor scans the workpiece surfaces in accordance with a predetermined relative movement pattern between sensor and workpiece. The sensor is a pneumatic measuring head, so that the measuring procedure can be incorporated in the production process. The pneumatic measuring head travels over the workpiece surface along a continuous path which covers the surface area of the workpiece. The pneumatic measuring head is maintained at a constant basic or measuring distance from the workpiece surface, so that the measuring range of the measuring head is not exceeded when the measuring head travels over the workpiece surface. The measuring head continuously produces measurement signals, so that the measure procedure can be directly integrated in the production sequence.

16 Claims, 5 Drawing Sheets

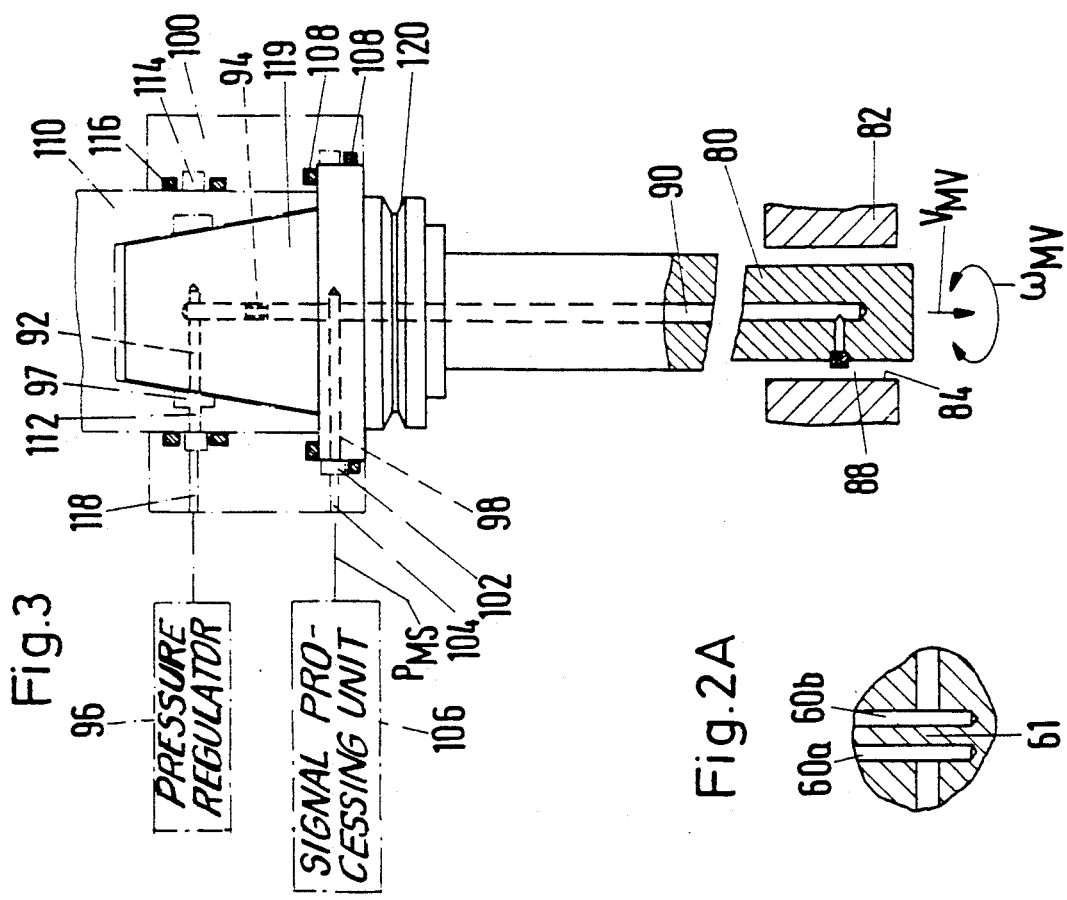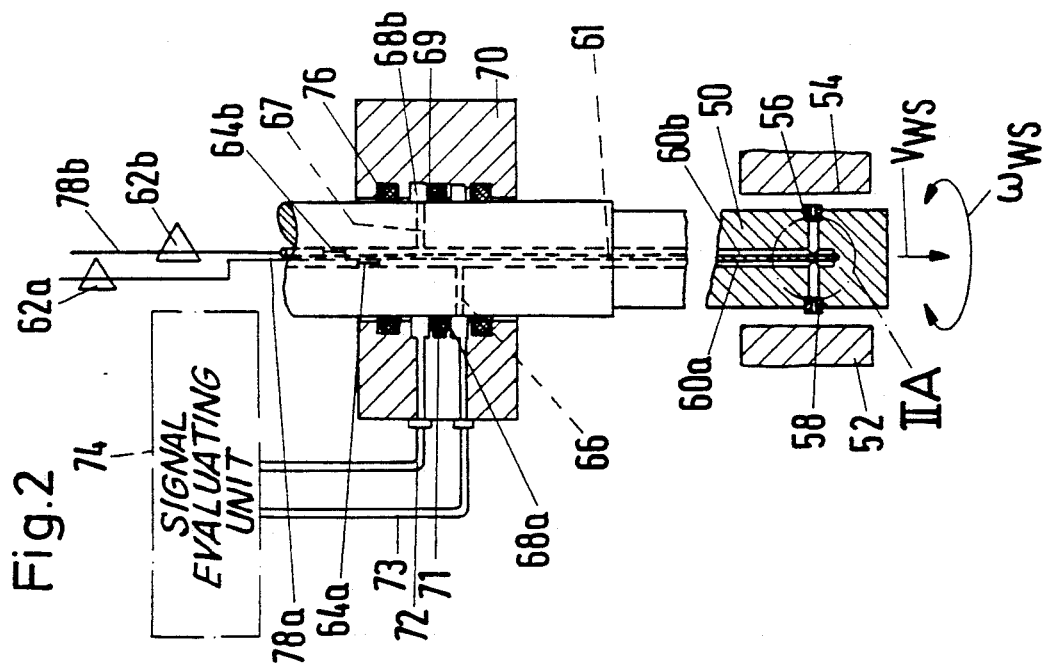

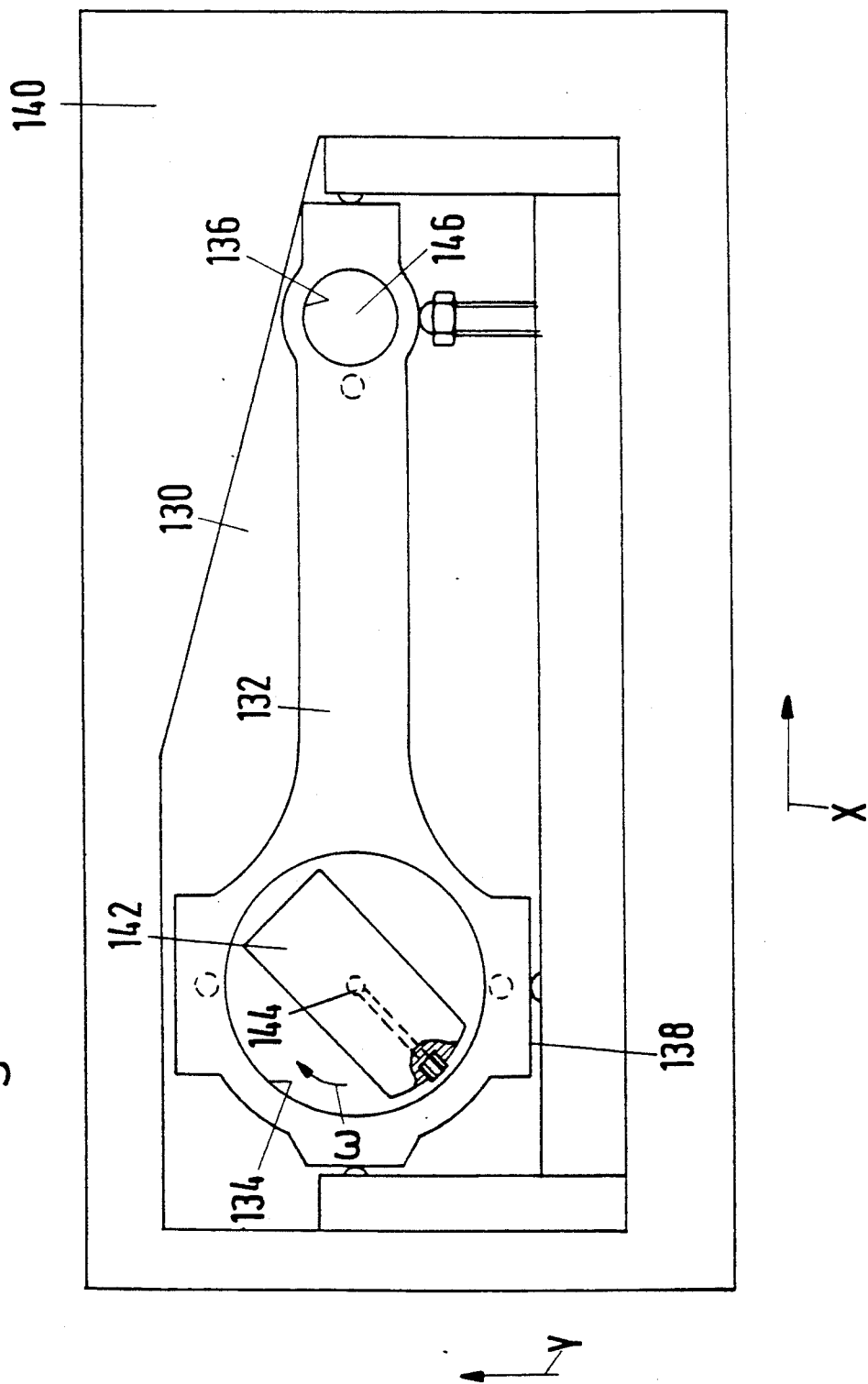

METHOD AND APPARATUS FOR DETERMINING THE DIMENSIONAL ACCURACY OF WORKPIECE SURFACES

BACKGROUND OF THE INVENTION

1. Field of the Invention

The present invention relates to a method for determining the dimensional accuracy of workpiece surfaces. The method includes placing a measuring device with a sensor in an operational position relative to the workpiece surface in which the sensor delivers measurement data to the measuring device while changing the angular position relative to the workpiece.

The present invention further relates to an apparatus for carrying out the above-described method. The apparatus includes a holding device for the sensor and the workpiece in order to facilitate a relative sliding and rotating movement between the workpiece and the sensor along or about the axis of the workpiece surface.

2. Description of the Related Art

Particularly in the manufacture of high precision, cylindrical workpiece surfaces which are usually produced by means of powerful and, thus, relatively expensive tools, the tools being used are required to have an extremely long service life. The desired long service life can only be achieved if the quality of processing is monitored to a sufficient extent. Therefore, it has been attempted in the past to integrate in a processing center measuring devices which scan the already processed workpiece surface point by point, so that the measurement signals can be used in the manufacture. For this purpose, a measuring unit which is independent because of an integrated voltage source is equipped with a chucking cone for the coupling to a holding means of the tool system.

Compared to a quality control in which the processed workpiece must be transported to a separate measuring point either manually or by means of a manipulating device, for example, an industrial robot, the above-described method has the advantage that the positional accuracy of the processed workpiece surface in space can be monitored with relatively simple means and with high precision at the same time. It has been found particularly disadvantageous that the processed workpiece surface can only be measured point by point with the workpiece standing still because the scanners would be ground off too quickly when the workpiece rotates. In addition, particularly when a large number of chips are produced, the workpiece surface must be cleaned frequently prior to scanner contact. These and other measures have the consequence that the measuring procedure takes a long time and the workpiece cannot be measured between the measuring points. Therefore, the integration of the measuring procedure into the continuing manufacturing process was not possible in the past.

SUMMARY OF THE INVENTION

It is, therefore, the primary object of the present invention to provide a method and an apparatus of the above-described type for determining the dimensional accuracy of a processed workpiece surface which is essentially rotationally symmetric, for example, does not deviate or deviates only slightly from an exactly cylindrical shape, by means of which it is possible to integrate without problems the measuring procedure in the processing process by measuring the workpiece surface which has just been finished without a prior intermediate step within the shortest time and with a high degree of reproducibility.

In accordance with the present invention, the workpieces are scanned by means of at least one sensor in the form of a pneumatic measuring head which operates without contact, wherein the measuring head is moved steadily on a path which covers the surface area of the workpiece, and wherein the path of the measuring head is spaced from the workpiece surface by a predetermined, essentially constant distance which corresponds to the measuring distance.

The apparatus according to the present invention for carrying out the method includes at least one pneumatic measuring head which provides measurement signals during the steady relative movement between the workpiece surface and sensor which movement covers the surface area of the workpiece. The apparatus further includes a guiding device for holding the measuring head as it travels along the measuring path at such a basic distance from the workpiece surface that the measuring range of the measuring head is not exceeded. An evaluating device assigns the continuously produced measurement signals to the respective measuring points.

The present invention makes it possible to monitor the manufacturing process directly at the location and within a very short period. In particular, the invention makes it possible to measure the workpiece surface without an additional manipulating step, for example, a transporting step, a rechucking step or a cleaning step. That is because a pneumatic measuring head is used which measures without contact. Thus, it is easily possible to suppress various spurious signals. Since there is no contact between the pneumatic measuring head and the workpiece surface to be measured, when these workpiece surfaces to be measured are manufactured, for example, surface grooves produced during a rotary processing, the measuring head can be moved with relatively high speed and with any orientation of the measurement path without leading to significant falsification of the measurement signal. In this manner, it is possible to scan the workpiece surface, for example, a cylindrical or rotationally symmetric workpiece surface, by means of a continuous and steady movement along a meander-like or a helical line and, thus, with a very high speed. As a result, the manufacturing process must only be interrupted for a relatively short period of time for carrying out the measurement procedure. The method is equally suitable for measuring outer surfaces and inner surfaces.

When the feeding speed and the angular speed of the pneumatic measuring head are suitably coordinated, the scanning on a helical measurement path can be carried out with the predetermined measuring accuracy, while minimizing the measuring time. The guiding device for the measuring head merely must ensure that the steadily traveled path of the measuring head follows the surface to be measured closely, so that the measurement range of the measuring head is not exceeded. The path on which the measuring head is moved must be predetermined accordingly, wherein the guiding device may be, for example, a gear unit or another suitable path control. The continuously produced measurement signals continuously provide information with respect to the actual deviations of the actual surface from the desired surface. Thus, it is possible, for example, when measuring a slightly conical workpiece surface, to move the measuring head on a cylindrical surface which includes or circumscribes this surface, as long as deviations from the mathematically exact cylindrical surface do not exceed the measuring range of the measuring head.

Since the scanning is carried out without contact, it is also possible to scan surfaces of different orientation in space immediately successively, so that the measuring procedure is further accelerated. For example, after measuring an inner bore, it is possible to measure without interruption of the measuring procedure the planeness of the end face of this bore.

The method according to the invention further makes it possible to arrange the measuring device at any location of a magazine and to move the measuring device qualitatively in the same manner as the tool which processes the workpiece surface.

When it is ensured that the measuring device is positioned with a high accuracy on the processing machine, the method of the invention makes it not only possible to measure the workpiece surface itself with respect to the quality thereof, for example, roundness, peak-to-valley height, diameter accuracy etc., but the workpiece surface can also be monitored with respect to its positional accuracy relative to a reference point of the workpiece. The positional accuracy of the measuring device can be obtained, for example, by providing the measuring device with a coupling member which permits an exact positioning on the processing machine. In this case, the measuring device according to the present invention has an adapter for a holding means of a machine tool, so that the measuring device can be replaced and moved into position in the same manner as a tool.

By varying the number of pneumatic measuring heads and/or the number of measuring nozzles, the value of the measurement signal can be further increased without slowing down the measuring procedure. For example, when two measuring nozzles are used, the comparisons of the measurement signals which are offset by 180° make it easily possible to draw a conclusion with respect to the deviation of the workpiece surface from the reference axis. The method according to the present invention provides the additional advantage that it operates independently of the optical and electrical properties of the workpiece. Thus, the method and the measuring device can be used irrespective of the properties of the workpiece.

To make the measuring method and the measuring device part of the processing procedure, the pneumatic measurement signal is transformed into a current signal and this signal is then further processed. In this manner, it is possible with simple means to store the measurement signals of previous measurements and to compare the actual measurement signals with the stored values. This further development of the invention has the particular advantage that it can be used effectively in the production because it makes it possible either to continuously correct the manufacturing process or to provide a reject signal when a limit signal value is exceeded.

The transformation of the pneumatic measurement signal into a current signal additionally makes it possible to record the measurement result without slowing down the measuring procedure.

The apparatus according to the present invention can be easily assembled. Only the guiding device requires a sufficiently high operating accuracy.

If the measurement path is formed by a helical curve, the driving device for generating a feeding and rotating movement which already exists when processing cylindrical surfaces can advantageously be used as a synchronizing device.

In accordance with a further development, the apparatus of the invention can be made part of a magazine, for example, in a tool revolver of a machine tool, so that the time required for evaluating the workpiece surface can be further reduced. When using the tool revolver, the measuring device must only be moved into the operating position. Subsequently, the pneumatic measuring head is moved along a predetermined measurement path, for example, in a meander-like or helical line, relative to the workpiece surface, while the measuring head continuously produces measurement signals. The evaluating device assigns the measurement values to the individual measurement positions, so that the measuring procedure is already concluded after the measurement head has been retracted. Advantageously, the return stroke of the measuring device is also used for making measurements, wherein preferably a predetermined relative rotation between measuring head and workpiece surface about 180° is carried out.

The method according to the present invention is not limited to a certain geometry of the workpiece surface. It is also possible to scan workpiece surfaces in which different surfaces are arranged next to each other, for example, cylindrical surfaces, conical surfaces or plane surfaces. In this case, it is merely necessary to control or program the guiding device in such a way that the measuring head is guided on a path which is determined by the desired values of the measuring curves and that the measuring head is spaced from the workpiece by the measuring distance.

The method and the apparatus according to the present invention can be utilized to equal economic advantage for the measurement of external surfaces and internal surfaces. The relative rotating and advancing movements between the pneumatic measuring head and the workpiece surface can be produced in different ways. When the relative rotating movement between the pneumatic measuring head and the workpiece is obtained by only rotating the workpiece, the measuring device becomes even more technically simple because, in that case, the compressed line for the signals does not have to be conducted through an interface which is rotated.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 2 is schematic sectional view of another embodiment of the measuring device;

FIG. 2a shows, on a larger scale, the detail IIA of FIG. 2;

FIG. 3 is a schematic sectional view of the a third embodiment of the measuring device;

FIG. 4 is a schematic top view of a workpiece holding device for illustrating the positional relationship between the pneumatic measuring head of FIG. 1 and the workpiece surface to be measured;

DESCRIPTION OF THE PREFERRED EMBODIMENT

Figure 1:
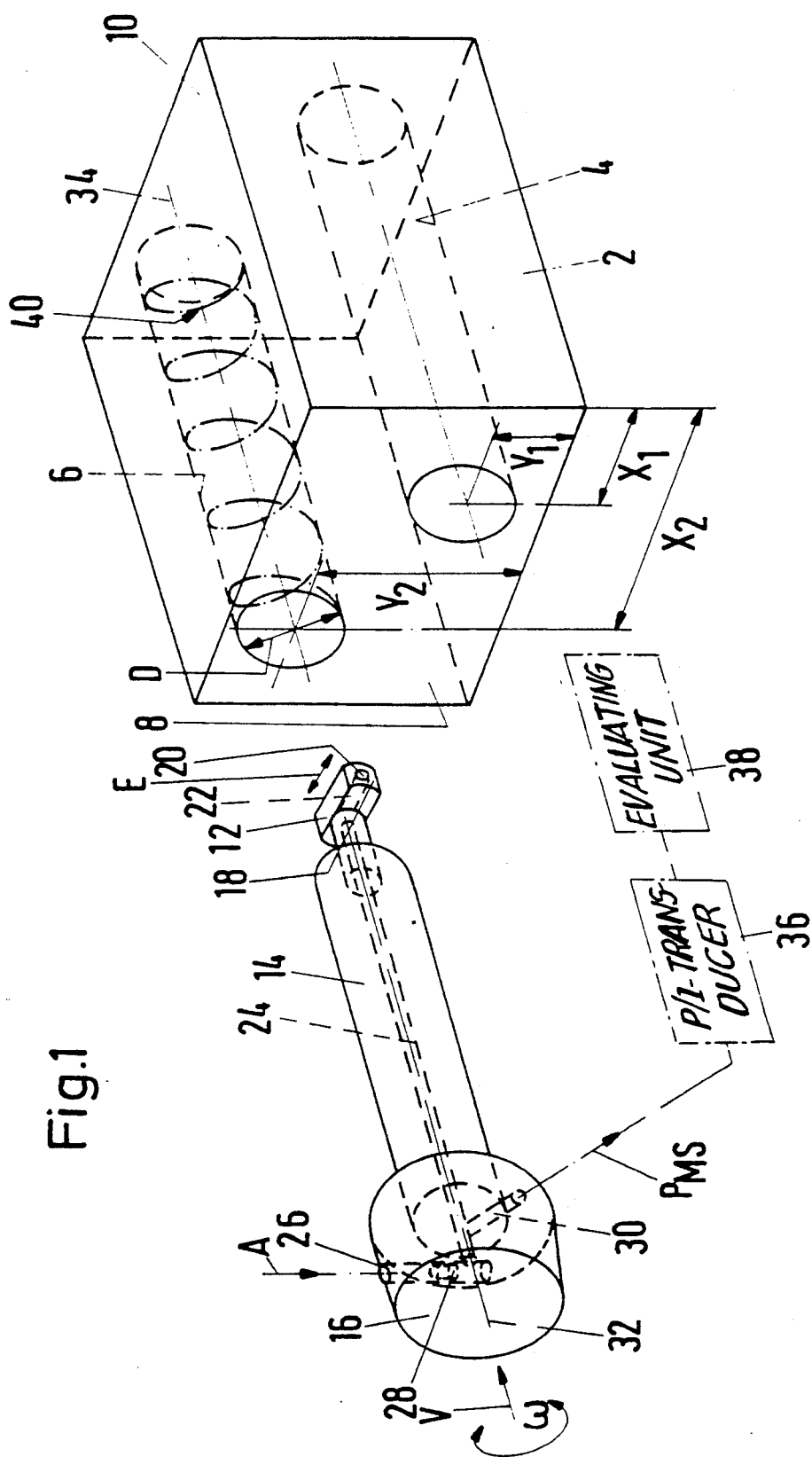
FIG. 1 is a schematic perspective view of a first embodiment of the apparatus according to the present invention, showing the positional relationship between the measuring device and the workpiece surfaces of a workpiece to be measured.

In FIG. 1 of the drawing, reference numeral 2 denotes a workpiece in which two bores 4 and 6 having the coordinates X1, Y1 and X2, Y2 with predetermined quality are to be made. The quality criteria are, for example, for the bore diameter, the relative peak-to-valley height $R_t$, the accuracy of the position of the axis on the inlet side 8 and on the outlet side 10 of the workpiece 2, the roundness of the bore, etc. A pneumatic measuring head 12 is used for monitoring the criteria of dimensional accuracy of the workpiece surfaces 4 and 6 quickly and with apparatus which is as simple and inexpensive as possible. The workpiece surfaces 4 and 6 are to be monitored either continuously or after the workpiece has been finished. The pneumatic measuring head 12 is supported by a cylindrical holder 14. The holder 14 is mounted on a connecting member 16 which can interact with a suitable cutting mechanism which is not illustrated in detail in FIG. 1. The cutting mechanism is arranged either at the machine tool or on a tool magazine.

The pneumatic measuring head 12 has a measuring nozzle 20 on its radially outer measuring surface 18. As indicated by arrow A, the measuring nozzle 20 is supplied with compressed air through a radial duct 22, a central axial duct 24 and a supply duct 26. The supply duct 26 includes a control valve 28 for supplying the preferably oil-free compressed air which is controlled to a pressure of p<3 bar. A measuring pressure line 30 for conducting the measurement signals to a signal evaluation unit, not shown, branches from the axial duct 24 downstream of the control valve 28.

The measuring apparatus constructed in this manner as a pneumatic gauge operates according to the principle of the nozzle reflecting plate system, wherein the reflecting plate is formed by the workpiece surface. This principle requires at least one measuring nozzle 20 whose air passage is throttled by the workpiece and a valve 28 with constant cross-section. A constant feed pressure is supplied to the valve 28. Depending on the ratio of surface areas between the measuring nozzle 20 and the control valve 28, a pressure builds up between the two reduced diameter portions which is a measure for the distance between the workpiece surface and the measuring nozzle. The measuring nozzle 20 extends through the measuring surface 18 which is, for example, cylindrical or conical, and is placed relative to the workpiece surface 4 or 6 to be measured into a position in which a small measuring gap remains. For this purpose, when the pneumatic measuring head 12 is rotated, the pneumatic measuring head 12 is advantageously mounted on the holder 14 so as to be adjustable in radial direction, so that the measurement of internal workpiece surfaces with different diameters is possible. This adjustment possibility is indicated by double arrow E.

The measuring gap between the measuring nozzle 20 and the workpiece surface 4, 6 determines the air flow through the measuring nozzle 20 and, thus, influences the measurement signal pressure $P_{MS}$ in the measuring pressure line 30. As a result, assuming that an axis 32 of the holder 14 is placed in alignment with the desired axis 34 of the workpiece surface 6, 4 to be measured, the dynamic pressure created between the measuring nozzle 20 and the valve 28 results in a measure for the diameter D of the bore 6, 4 and for the positional accuracy of the bore by previously calibrating the pneumatic measuring head, for example, with the use of ground or cut adjusting rings, absolute values of positional deviations can be assigned to the measurement signal pressures.

The measurement of the workpiece surface 6, 4 is carried out as follows: Initially, the axis 32 of the pneumatic measuring mandrel is aligned with the axis 34 of the workpiece surface 6 to be measured. The extent by which the measuring nozzle projects from the measuring surface 18 is adjusted to the desired diameter D of the workpiece surface 6 in such a way that an optimum measuring gap is created. To be able to examine the dimensional accuracy of the workpiece surface 6 within the shortest time and still reproducibly with sufficient accuracy, the pneumatic measuring head 12 is moved with a predetermined angular speed $\omega$ relative to the workpiece 2 while simultaneously carrying out a feeding movement with a speed V. As a result, the measuring nozzle 12 describes a movement along a helical line shown in dash-dot lines relative to the inner surface 6 of the workpiece 2, while measurement signals are continuously taken through the measuring pressure line 30. The measured signal pressure is supplied to a p/i-transducer 36 which carries out the transformation of the pressure signal into an electrical analog signal. This electrical signal is then transferred to a signal evaluating unit 38 which, for example, with the aid of an oscillograph or limit contacts, carries out a signal processing, such that the finishing process or working process of the subsequent workpiece is influenced. The signal evaluating unit can further record the electrical signals and can prepare measurement records at a later time.

To adapt the measuring quality to the desired surface quality, the shape of the helical line can be varied by suitably adjusting the relative angular speed $\omega$ and the relative translatory speed V. Moreover, the measurement quality can be changed by varying the number of pneumatic measuring heads 12 and/or measuring nozzles 20. Finally, it is possible to repeat the measurement procedure during the return stroke of the pneumatic measuring head 12. In this connection, it is an advantage if, after reaching an end point 40 of the helical line, the measuring head 12 is further rotated by 180° without a simultaneous translatory movement, and subsequently to carry out the measuring procedure with the preadjusted values $\omega$ and V in the opposite direction.

It has been found that it is possible with an apparatus of the above-described type to reproducibly measure cylindrical workpiece surfaces with an accuracy of +/−2 μm. This simultaneously means that positional deviations can also be qualitatively determined within this tolerance range. A particular advantage is the selfcleaning effect at the measuring point and the minor influence of external vibrations because of the contactless measurement. Accordingly, the measuring method according to the present invention is particularly suitable for use in relatively demanding manufacturing operations.

Of course, for carrying out the measurement, it is not necessary that the pneumatic measuring head alone carries out the movements for obtaining the relative movement along a helical line between the workpiece surface and the pneumatic measuring head. FIG. 2 of the drawing shows an embodiment in which at least the rotating movement is carried out by the workpiece. In this embodiment, reference numeral 50 denotes a nozzle mandrel which is used for measuring an internal bore 54 of a workpiece 52. The nozzle mandrel 50 has two pneumatic measuring nozzles 56 and 58 which are supplied through two pneumatic lines 60a and 60b. As can be seen in FIG. 2A, the lines 60a and 60b are formed by bores with a web 61 remaining between the bores. The feed pressure supplied to the pneumatic lines 60a and 60b is generated by means of a pressure regulator 62a and 62b, respectively. Control valves 64a and 64b, respectively, are arranged in lines 60a and 60b. The valves 64a and 64b may be formed, for example, as blocks with a passage and, thus, have a constant cross-sectional area of the passage. Such blocks with holes are used, for example, in the watch-making industry.

Radial measuring pressure lines 66 and 67 branch from the lines 60a and 60b downstream of the valve 64a and 64b. The lines 66 and 67 each lead into an annular chamber 68a and 68b which are defined in a connecting member 70 and between which is provided a web member 69 with an annular rope seal 71. The pressure in the annular chambers 68a and 68b is conducted through signal pressure lines 72 and 73 to a signal evaluating unit 74. The operation of the signal evaluation unit 74 was described with respect to the embodiment shown in FIG. 1. Sealing members 66 seal the annular chambers 68a and 68b relative to the atmosphere.

Contrary to the embodiment of FIG. 1, the nozzle mandrel 50 of the embodiment of FIG. 2 does not carry out a rotating movement. In this case, the relative rotating movement between workpiece 52 and measuring nozzles 56, 58 is carried out by a drive for the workpiece 52 which is indicated by arrow $\omega_{WS}$. The translatory relative movement V is produced either by a linear drive of the nozzle mandrel 50 and/or by a linear drive of the workpiece 52.

In the embodiment shown in FIG. 2, the measuring speed can be additionally increased because two measuring points 56 and 58 carry out measurements simultaneously and independently of each other. This embodiment is particularly suitable for measuring turned pieces which are measured when chucked into the turning lathes by means of a nozzle mandrel 50 which exclusively carries out a translatory movement along the axis of the turning lathe. For example, the nozzle mandrel 50 may be mounted on a tool revolver of a processing center, wherein the connecting member 70 remains connected with the signal evaluating unit 74 through the preferably flexible signal pressure lines 72 and 73. The measuring system is also supplied with compressed air through flexible air lines 78a and 78b.

FIG. 3 of the drawing shows another embodiment of the measuring apparatus in which the relative movement between the measuring head and the workpiece is effected exclusively by moving the pneumatic measuring head. In this embodiment, a nozzle mandrel 80 is used which has only one pneumatic measuring nozzle 88 for measuring an internal bore 84 of a workpiece 82. Reference number 90 denotes an essentially axis-parallel, central pneumatic line. Reference numeral 92 denotes a tap line which branches from the central pneumatic line 90 for feeding air from a pressure regulator 96 into the central pneumatic line 90. A fixed value control valve 94 is arranged in the pneumatic line for throttling the measuring pressure in a range within which an approximately linear dependency exists between nozzle cross-section and measuring pressure. A measuring pressure line 98 leads into an annular chamber 102 in a connecting member 100. A signal pressure duct 104 leads radially further outwardly from the annular chamber 102 and is connected to a pressure hose, not illustrated, which conducts the measuring pressure $P_{ms}$ to a signal processing unit 106. The connecting member 100 is stationary with respect to rotation, but is moved translatory together with the nozzle mandrel 80. Sealing members 108 serve to seal the annular chamber 102 relative to the atmosphere.

A structure similar to the one described above is provided in the region of the air supply. A tap line 92 leads into an annular recess 97 in a tool holding means 110 which may be, for example, in the form of a steep-angle taper. A line portion 112 leads from the annular recess 97 radially toward the outside into another annular chamber 114 in the connecting member 100. The annular chamber 114 is also sealed relative to the atmosphere by means of sealing members 116. A supply duct 118 serves to supply air from the pressure regulator 96 into the measuring head.

The embodiment shown in FIG. 3 includes a particular feature in that the nozzle mandrel 80 is equipped on its side facing away from the measuring nozzle 88 with an adapter 119 for coupling to a workpiece chucking system or tool chucking system. While details of the cutting system are not shown in FIG. 3, it should be emphasized that an advantageous construction of the adapter 119 should facilitate an automatic exchange of the nozzle mandrel 80. For this purpose, a gripping groove 120 is provided at which the nozzle mandrel 80 can be grasped and transported by means of a suitable manipulating device toward a magazine and away from the magazine. The holding means 110 may be, for example, a fitted recess in a driven shaft of a star revolver in a processing center, so that the measuring procedure is carried out by placing the measuring head in position immediately after the bore 84 is finished by a step-wise movement of the revolver and the measuring procedure can be finished within the shortest period of time. The revolver carrier is moved translatory which is indicated by arrow $V_{MV}$, while the drive shaft and, thus, the holding means 110 is driven with the angular speed $\omega_{MV}$.

FIG. 4 of the drawing shows the measuring principle of the invention in a top view of a chucking device 130 for a workpiece 132 in the form of a connecting rod. Two bores 134 and 136 are to be made in the connecting rod 132 in a predetermined positional relationship relative to each other and relative to a reference surface 138. The above-described measuring device is particularly suitable for determining the dimensional accuracy of the bores 134 and 136. This is because, after the bores have been finished, for example, by a precision drilling tool or a reamer, a table supporting the chucking device 130 can remain in the work position. The processing tool is replaced for the measuring procedure by a pneumatic measuring head 142 which is coupled through an adapter to a tool carrier. As a result, the axis 144 necessarily coincides with the desired axis of the bore 134. By removing the pneumatic measuring head 142 in a direction extending perpendicularly to the plane of the drawing of FIG. 4, while simultaneously carrying out a rotating movement with the angular speed $\omega$, it is not only possible to evaluate the quality of the bore 134, i.e., the roundness and diameter accuracy, but positional accuracy of the bore sensor can also be tested. For measuring the other bore 136, the pneumatic measuring head 142 is moved out of the bore 134. Subsequently, the table 140 carries out a preferably program-controlled movement in the direction of coordinates X and Y, so that the center 146 of the other bore 136 is closed. The measurement is now repeated for the bore 136 by means of an appropriately smaller pneumatic measuring head.

The method according to the present invention can also be used for measuring bores with a single measuring stroke wherein the diameter quality of bores vary over the length of the bores. This type of application shall now be explained with the aid of FIG. 5.

Figure 5:
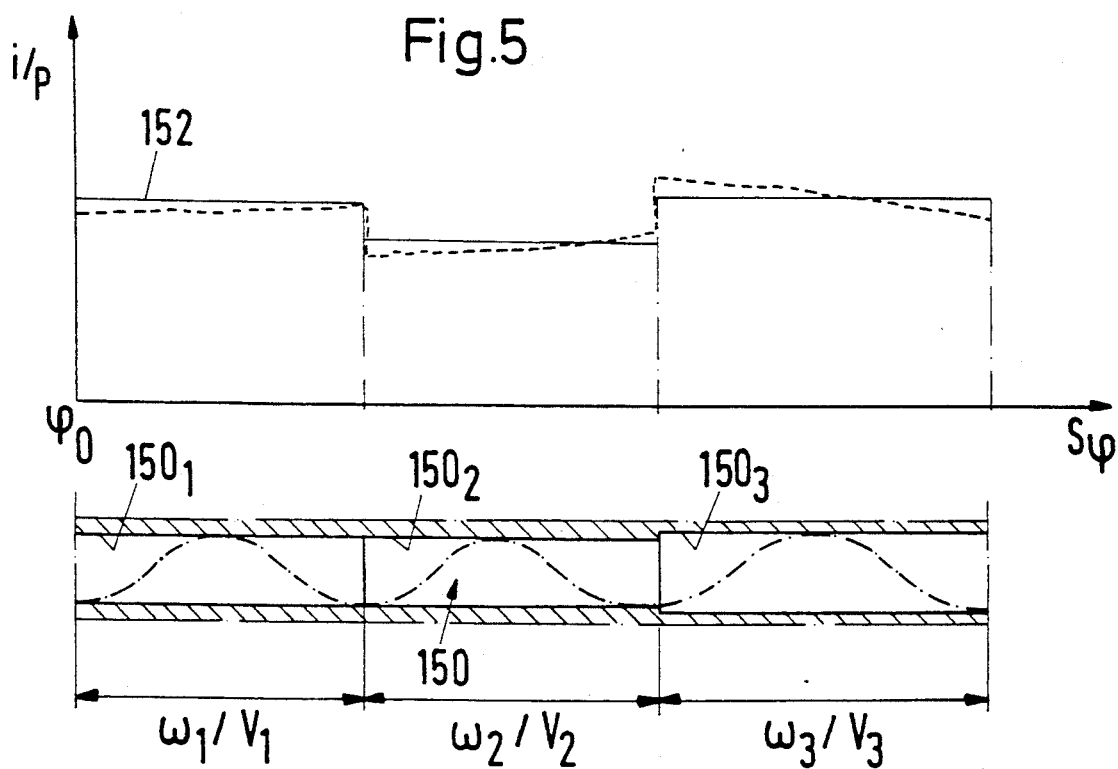
FIG. 5 is a diagram showing the correlation of a measurement signal and a workpiece surface.

A bore 150 has three bore portions $150_1$, $150_2$ and $150_3$. The bore portions may have different nominal diameters or they may merely have different tolerances. A desired signal 152 which is illustrated at the top of FIG. 5 with solid lines is assigned to the bore 150. The value of the desired signal 152 jumps at the transition points between the bore portions. A dash-dot line illustrates the relative movement curve between a measuring nozzle of the pneumatic measuring head and the and the inner surface of the bore 150. In the bore portion $150_1$, the relative angular speed is $\omega_1$ and the relative translatory speed is $V_1$. In the second and third bore portions, different relative speeds and feed values may be provided, wherein these parameters are advantageously selected such that the feeding speed becomes slower with increasing requirements with respect to the quality of the bore portion.

Figure 6:
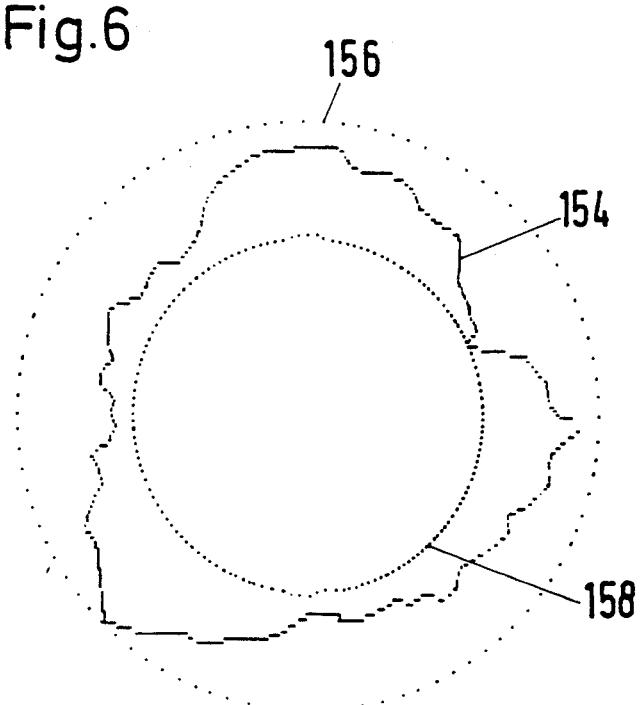
FIG. 6 is a measurement record obtainable with the measuring device according to the present invention.

The measurement signal obtained during the travel through the bore portions over distance s is shown in a dash-dot line. Since a certain correlation exists between the angular speed $\omega_1$ and the translatory speed $V_1$ in the bore portion $150_1$, the measurement signal i/p is simultaneously recorded in dependence on the relative rotation angle $\phi$. In the signal processing unit which preferably includes a computer, it is possible to conclude from the pattern of the measurement signal whether the signal deviation from the desired signal 152 are due to a positional deviation of the bore axis from the desired value or only because the bore is not circular. Thus, it is possible to prepare a record as shown in FIG. 6 for any radial portion of the bore. Specifically, FIG. 6 shows in an enlarged and distorted manner the inner surface 154 of the bore. The two dotted concentric circles 156, 158 represent tolerance limit curves which the signal processing unit determines itself from the data which was previously fed in. Accordingly, it is possible automatically to eliminate a workpiece when the signal processing unit generates an appropriate signal when the actual curve 154 intersects the tolerance curve 156 or 158.

The signal processing unit can be advantageously incorporated into the manufacturing process, so that from the deviations of the actual curves are placed adjusting signals on the machine tool for carrying out a correcting function.

It is apparent that the meaningfulness of the measurement can be improved either by providing several pneumatic measuring heads and/or several measuring nozzles which travel over the workpiece surface to be measured either simultaneously or sequentially. The measuring device itself is more complex as a result, however, the work required for programming the signal evaluating unit is reduced simultaneously.

Figure 7:
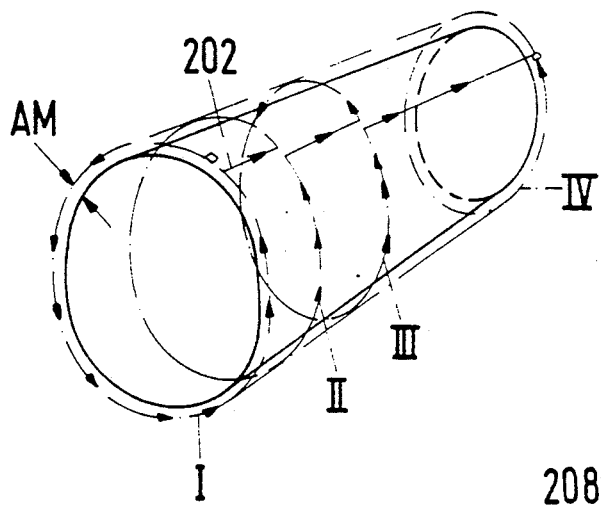
FIG. 7 is a perspective view showing the travel path of the measuring head for scanning a conical workpiece surface.
Figure 8:
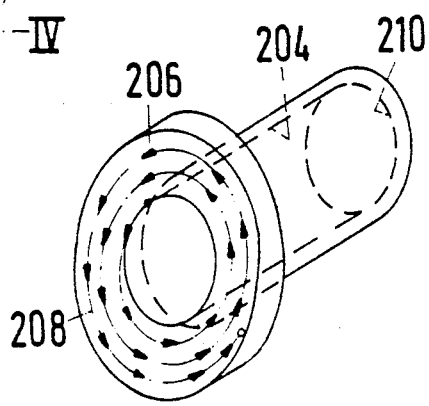
FIG. 8 is a perspective view showing the travel path of the measuring head for scanning an end face.
Figure 9:
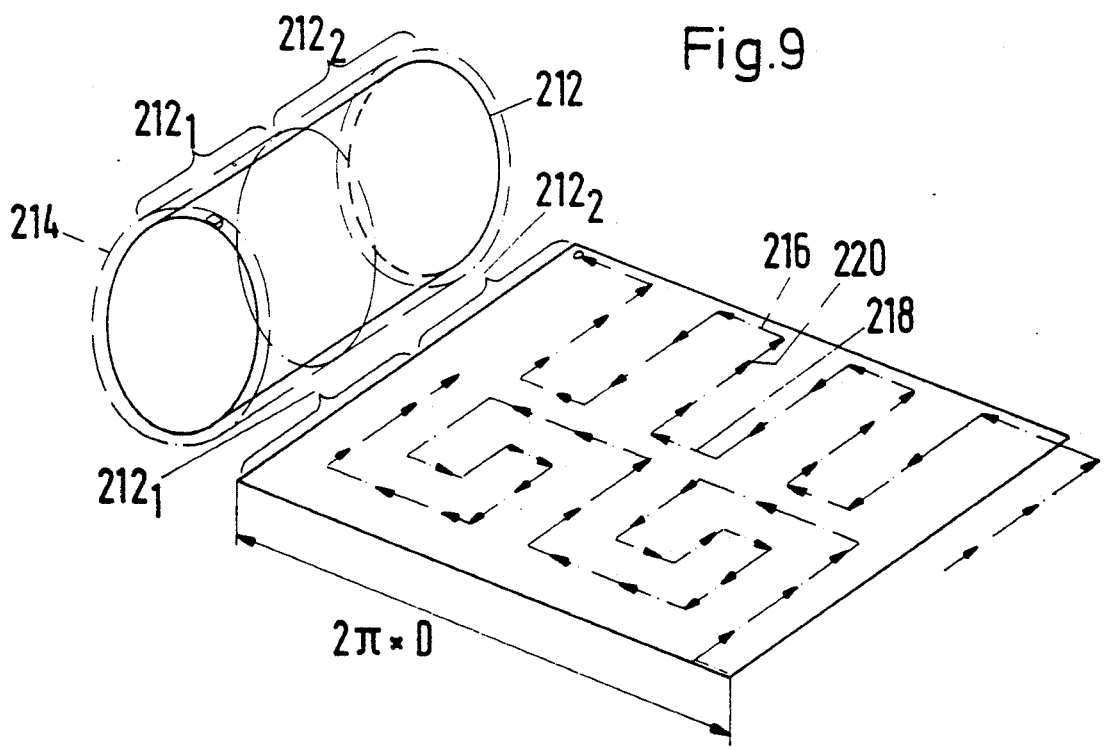
FIG. 9 a perspective view showing the travel path of the measuring head for scanning a cylindrical external surface.

The method according to the present invention has been described above with the aid of an embodiment in which the path on which the measuring head is moved is formed by a helical line. FIGS. 7 to 9 of the drawing show other measuring paths which also make possible the incorporation of the measuring procedure into the production sequence.

As illustrated in FIG. 7, a conical workpiece surface is measured by the measuring head which successively travels axially offset circular paths I, II, III and IV and is moved between the circular paths along axial connecting paths 202 without changing the measuring distance $A_M$.

The distance $A_M$ and, thus, the surface on which the path of movement of the measuring head is located, is determined in relation to the surface to be measured in such a way that changes of the distance between workpiece surface and measuring head or measuring nozzle which occur during the travel of the measuring head do not exceed the measuring range of the measuring head.

In the embodiment shown in FIG. 8, an end face 206 is measured following the measurement of a cylindrical inner surface 204. For this purpose, the measuring sensor or measuring head is moved outwardly on a spiral path 208 after leaving the bore 210. Also in this case, a guiding device, not illustrated in detail, ensures that the distance between the workpiece surface and the measuring head is maintained at a predetermined, constant basic distance. The measuring head is to be positioned so as to extend perpendicularly to the surface to be measured. However, it is also conceivable to operate with two measuring nozzles or measuring heads which extend at an angle relative to each other and are closed alternatingly.

The embodiment according to FIG. 9 shows the use of the method of the invention for measuring cylindrical outer surfaces. The measuring path surface 214 which surrounds the outer surface 212 and in which the measuring head is steadily moved is shown in dash-dot lines. It is assumed that the workpiece surface 212 has two portions $212_1$ and $212_2$ of different surface qualities which are to be measured successively.

As the development of the surface shows in which the path traveled by the measuring head is located, the measuring head travels meander-like over the workpiece surface in order to obtain a measuring line which is as long as possible. The circle segment path portions 216 and 218 are connected through axial connecting path portions 220. In order to take the surface quality into account, the length of the path is greater in the portion $212_1$ than in the portion $212_2$.

The measuring path in the portion $212_1$ continues without interruption in the measuring path in the portion $212_2$ in which the length of the path is smaller per unit of surface area.

In addition to the embodiments discussed above and illustrated in the drawing, the measuring head can measure any surface which is symmetrical with respect to rotation. In this case, the measuring head has to be controlled in the same manner as the tool had been controlled previously.

Of course, the above-described method can also be used for evaluating the dimensional accuracy of any outer surface of a workpiece. It must be ensured that the guiding device for the measuring head maintains a predetermined basic distance between the workpiece surface and the measuring nozzle.

It has even been found that the method according to the invention is also suitable for measuring essentially cylindrical workpiece surfaces which, seen in the radial section, slightly deviate from the circular shape which, for example, is the case in the crosshead bore of a piston of an internal combustion engine. Also, the dimensional accuracy of workpiece surfaces can be evaluated which in accordance with a predetermined mathematical relationship deviate from a theoretical or from a mathematically exact cylindrical shape.

Accordingly, the present invention provides a method and an apparatus for determining the accuracy of the position and/or the shape of workpiece surfaces, for example, essentially cylindrical workpiece surfaces, wherein a measuring sensor senses the workpiece surface in accordance with a predetermined relative movement pattern between sensor and workpiece. For a simple incorporation of the measuring method step into the production process, the sensor is a pneumatic measuring head which travels along the workpiece surface guided on a continuous path which covers the surface area of the workpiece, wherein the measuring head maintains a constant basic or measuring distance from the workpiece surface, so that the measuring range of the measuring head is not exceeded as the measuring head travels over the workpiece surface. The measuring sensor continuously produces measuring signals, so that the direct integration of the measuring procedure into the production sequence is possible.

While specific embodiments of the invention have been shown and described in detail to illustrate the application of the inventive principles, it will be understood that the invention may be embodied otherwise without departing from such principles.

We claim:

1. In a method for determining the dimensional accuracy of a workpiece surface, the method including positioning a measuring device with at least one sensor relative to the workpiece surface, wherein the at least one sensor delivers measurement data to the measuring device while changing the angular position relative to the workpiece, the improvement comprising the at least one sensor being a pneumatic measuring head which operates without contact and steadily moving the measuring head with respect to the workpiece on a path which covers the surface area of the workpiece, while guiding said measuring head with respect to the workpiece surface such that the relative movement path of the measuring head is being kept spaced from the mathematically exact workpiece surface by a predetermined, essentially constant basic distance which corresponds to a measuring distance.

2. The method according to claim 1, wherein the at least one sensor produces an output signal, comprising comparing the output signal of the at least one sensor with a desired signal, wherein the desired signal is obtained by sensing a theoretically exact workpiece surface with an identical relative movement pattern.

3. The method according to claim 1, wherein, for measuring a surface which is symmetric with respect to rotation, the path of the measuring head includes a plurality of axially offset circular segment path portions and connecting path portions for connecting the circular segment path portions.

4. The method according to claim 1, wherein the path of the measuring head includes a plurality of circular path portions.

5. The method according to claim 1, wherein, for measuring a plane surface, the path of the measuring head has spiral portions.

6. The method according to claim 1, wherein, for measuring an essentially cylindrical workpiece surface, the path of the measuring head is a helical line.

7. The method according to claim 6, comprising determining the inclination of the helical line in dependence of the type and quality of workpiece surface.

8. The method according to claim 1, comprising carrying out scanning of the workpiece surface with the workpiece being chucked in a machine tool.

9. In an apparatus for determining the dimensional accuracy of a workpiece surface, the workpiece surface having an axis, the apparatus including a measuring device with at least one sensor, and a holding device for the at least one sensor and the workpiece for effecting a relative sliding and rotating movement between the workpiece and the at least one sensor along and about the axis of the workpiece surface, the improvement comprising the at least one sensor being a pneumatic measuring head, the pneumatic measuring head comprising means for producing measurement signals when a steady relative movement is carried out between the workpiece surface and the pneumatic measurement, which movement covers the surface area of the workpiece, a guiding device for holding the pneumatic measuring head as it travels along a measuring path at a basic distance from the workpiece surface such that a measuring range of the pneumatic measuring head is not exceeded, and an evaluating device for assigning the continuously produced measurement signals to respective measuring points.

10. The apparatus according to claim 9, wherein the holding device includes an adapter for coupling the holding device to a workpiece or tool chucking system of a machine tool.

11. The apparatus according to claim 9, wherein, for measuring an internal workpiece surface which is symmetric with respect to rotation, the sensor includes a measuring mandrel which has at least one pneumatic measuring nozzle, means including a control valve and a pressure regulator for conducting air to the pneumatic measuring nozzle, and means for supplying the pneumatic measurement signal between the control valve and the pneumatic measuring nozzle to a signal processing unit.

12. The apparatus according to claim 11, comprising a pressure signal line of the measuring mandrel, the pressure signal line including a pneumatic line in the mandrel extending essentially parallel to the axis of the mandrel, the pneumatic line being in communication with a radial line in the adapter, the radial line being in communication with a signal pressure chamber which is part of the holding device.

13. The apparatus according to claim 9, comprising means for converting the pneumatic measurement signals into analog electric signals, and a recording device for recording the analog electric signals.

14. The apparatus according to claim 9, comprising means for supplying the pneumatic measurement signals to a comparator, the comparator comprising means for producing output signals which are capable of influencing processing of the workpiece surface or, when a predetermined limit value is exceeded, release a discharge signal.

15. The apparatus according to claim 9, comprising a synchronizing device for assigning a predetermined extent of relative rotation between workpiece and measurement sensor to a predetermined relative distance of displacement between workpiece and measurement sensor.

16. The apparatus according to claim 9, wherein the guiding device for the measuring head is a gear unit.

* * * * *